United States Patent [19]
Wolff

[11] 4,366,706
[45] Jan. 4, 1983

[54] NEEDLE POSITION SENSING SYSTEM FOR A FUEL INJECTOR NOZZLE HOLDER

[76] Inventor: George Wolff, P.O. Drawer 9407, Winter Haven, Fla. 33880

[21] Appl. No.: 187,171

[22] Filed: Sep. 15, 1980

Related U.S. Application Data

[63] Continuation-in-part of Ser. No. 87,983, Oct. 25, 1979.

[51] Int. Cl.³ ............................................. G01M 15/00
[52] U.S. Cl. ................................. 73/119 A; 123/612; 123/617; 324/208; 340/870.31
[58] Field of Search ........................... 340/870.31, 686; 73/119 A; 123/612, 617; 324/207, 208; 239/533.2

[56] References Cited

U.S. PATENT DOCUMENTS

| | | | |
|---|---|---|---|
| 3,344,663 | 10/1967 | Dreisin et al. | 73/119 A |
| 3,412,602 | 11/1968 | Rush et al. | 73/119 A |
| 3,828,247 | 8/1974 | Kirsch et al. | 73/119 A |
| 3,942,366 | 3/1976 | Hofmann | 73/119 A |
| 4,096,841 | 6/1978 | Kindermann et al. | 123/617 |
| 4,109,518 | 8/1978 | Dooley et al. | 73/119 A |

FOREIGN PATENT DOCUMENTS 742742  6/1980  U.S.S.R. ........................... 73/119 A

OTHER PUBLICATIONS

Creative Tool Company, "CT4000 Diesel Tach-Time".

Primary Examiner—James J. Groody
Attorney, Agent, or Firm—Duckworth, Allen, Dyer and Pettis

[57] ABSTRACT

Fuel injector nozzle holders typically include a needle which is coupled within the nozzle holder and displaceable between open and closed positions. The nozzle holder also includes a chamber and a spring positioned within the chamber and coupled to the needle for biasing the needle toward the closed position. Prior art fuel injector nozzle holders can readily be modified to include a passageway for establishing communication with the chamber from a location external to the nozzle holder. This passageway may be dimensioned to permit an external sensing device which is capable of detecting displacements of the needle when positioned in proximity thereto to be inserted through the passageway into the chamber. A sensor holder is positioned within the chamber and aligned with the passageway to guide the sensor into a predetermined position with respect to the needle and to maintain the sensor in a fixed position.

47 Claims, 5 Drawing Figures

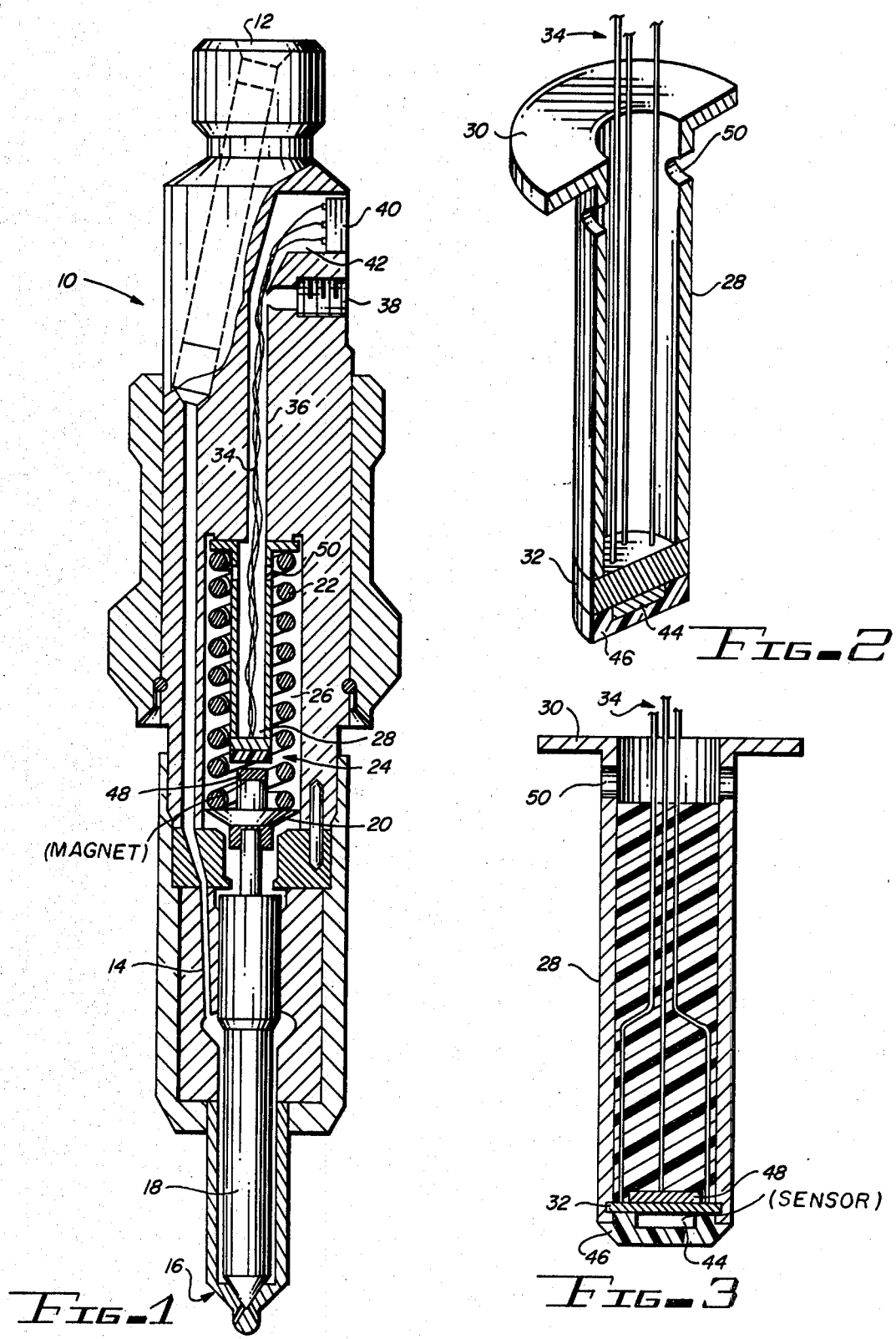

NEEDLE POSITION SENSING SYSTEM FOR A FUEL INJECTOR NOZZLE HOLDER

BACKGROUND OF THE INVENTION

This patent application is a continuation in part patent application of U.S. patent application Ser. No. 087,983, filed on Oct. 25, 1979.

1. Field of the Invention

The present invention relates to position indicators for fuel injector nozzle holders, and more particularly, to a needle position indicator which operates by detecting changes in the magnetic flux density within the interior of the nozzle holder.

2. Description of the Prior Art

A needle valve within a fuel injector nozzle holder is opened and closed at appropriately timed intervals to inject desired amounts of fuel into a cylinder of an internal combustion engine such as a diesel engine. It is essential to know when the needle valve opens in relation to the engine crank shaft position in order to designate the appropriate engine timing.

The needle valve comprises a needle and a needle seat. When the needle contacts the needle seat, the valve is closed. When the needle is lifted off the needle seat, the valve opens and fuel is metered through spray orifices into the interior of the engine cylinder. The initial relative vertical displacement between the needle and the needle seat determines the beginning of injection as well as the engine timing.

Engine timing must be set with precision to not only properly operate the engine, but also to control fuel consumption and the production of undesirable emissions. The engine timing must be set precisely for low fuel consumption while simultaneously minimizing undesired engine emissions. Since there is always a trade off between optimizing fuel consumption and minimizing emissions, engine timing must be set at a point which somewhat compromises both fuel consumption and emission reduction. As a result of the extremely stringent government fuel consumption and emission regulations, the engine timing must be optimized to levels substantially in excess of any prior art requirements. Conventionally, engine timing has been determined by reference to visual markings on the engine flywheel. A few experimental attempts have been made to electronically measure engine timing by determining needle position by inductive or capacitive devices positioned within a fuel injector nozzle holder.

The Creative Tool Company of Lyons, Illinois, is presently selling a product designated as a DIESEL TACH-TIME CT4000 instrument. This product utilizes a split-nut transducer which is installed on an engine cylinder fuel line at either the fuel injection pump or at the nozzle. The mechanical strains produced by the transit of a fuel pressure pulse through the fuel line create mechanical displacements of the fuel line and cause mechanical displacements of the split-nut transducer. When this transducer is deformed, an electrical impulse is sent to the tachometer-timing light unit. This device thereby provides a method of dynamically determining fuel injection pump timing.

SUMMARY OF THE INVENTION

The present invention contemplates a fuel injector nozzle holder capable of receiving a needle position sensor to permit dynamic measurement of needle position, thus permitting determination of the beginning of injection point or engine timing. The nozzle holder includes a needle which is displaceable between open and closed positions. The nozzle holder also includes an internal chamber and means positioned within the chamber and coupled to the needle for biasing the needle into the closed position. A passageway is provided in the nozzle holder for establishing communication with the chamber from a location external to the nozzle holder. Sensor holding means is positioned within the chamber and aligned with the passageway for guiding the sensor into a predetermined position with respect to the needle and for maintaining the sensor in a fixed position within the sensor holding means.

DESCRIPTION OF THE DRAWINGS

This invention is pointed out with particularity in the appended claims. However, other objects and advantages together with the operation of the invention may be better understood by reference to the following detailed description taken in conjunction with the following illustrations wherein:

FIG. 1 is a partially cut away sectional view of a fuel injector nozzle holder including a needle position indicator according to the present invention.

FIG. 2 is a partially cut away perspective view particularly illustrating the Hall Effect sensor and mounting bracket of the present invention.

FIG. 3 is a sectional view of a second embodiment of the Hall Effect sensor and its mounting bracket.

DETAILED DESCRIPTION OF THE INVENTION

Figures 4, 5:
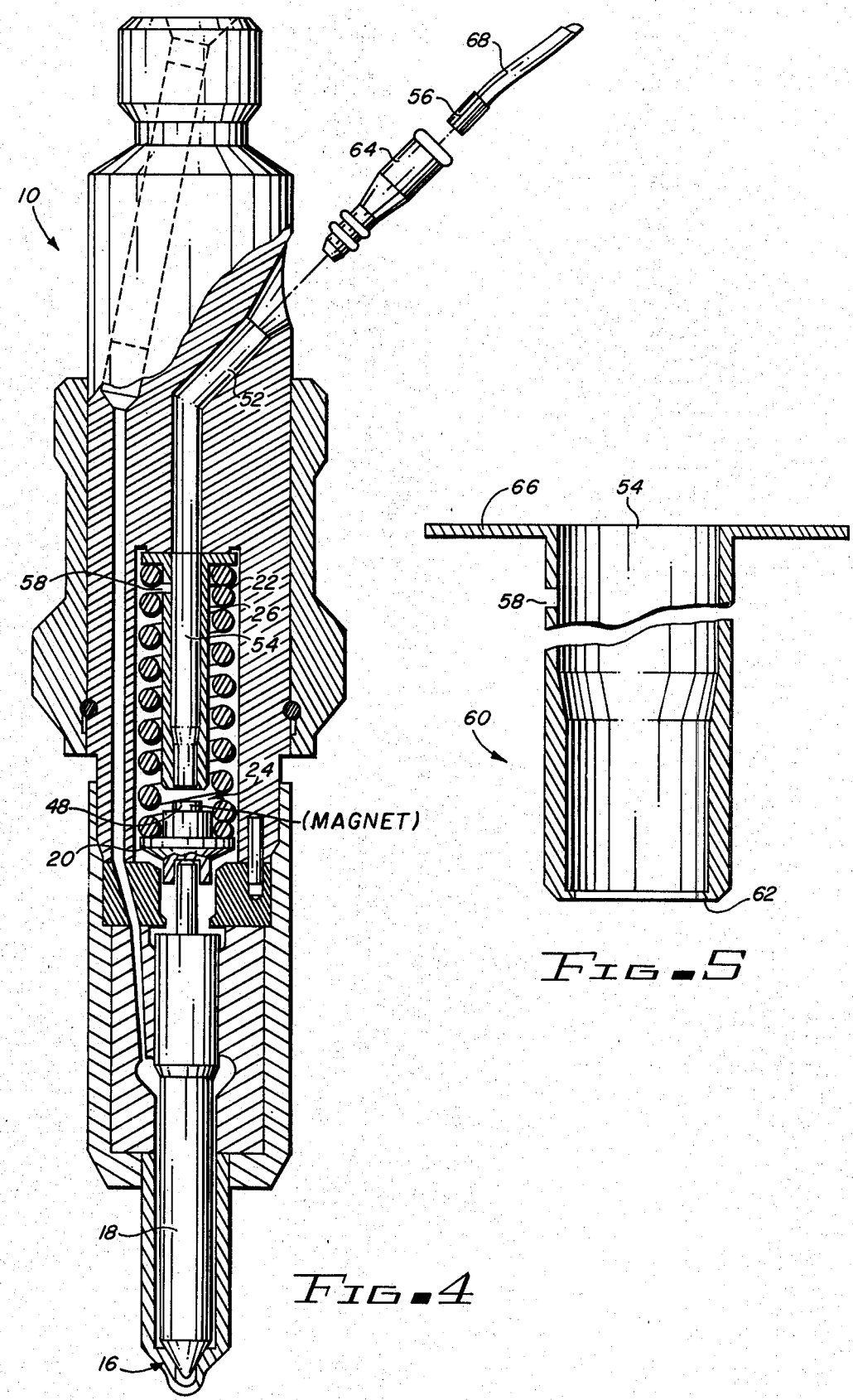
FIG. 4 is a sectional view of a fuel injector nozzle holder capable of receiving a needle position sensor.
FIG. 5 is a sectional view of one embodiment of the sensor holder which is positionable within the nozzle holder illustrated in FIG. 4.

In order to better illustrate the advantages of the invention and its contributions to the art, the various mechanical and electrical features of a first preferred embodiment of a non-removable version of the invention will now be described in detail.

Referring to FIGS. 1 and 2, a commonly used fuel injector nozzle holder 10 is illustrated. Nozzle holder 10 is of a conventional design and is commercially available from fuel injection equipment manufacturers such as Robert Bosch. A high pressure fuel line is coupled to input port 12 of nozzle holder 10. Pressurized fuel is transferred from input port 12 through passageway 14 into the lower section of nozzle holder 10 in which a needle valve is positioned. The needle valve includes a seat generally indicated by reference number 16 and a needle 18. A spring seat 20 is held by the spring against the upper section of needle 18 and forms an upper extension of needle 18. Spring seat 20 moves in synchronization with needle 18.

A cylindrical spring 22 includes a central spring cavity or passageway 24. Spring 22 is positioned with a cylindrical cavity 26 in nozzle holder 10. In the commercially manufactured version of fuel injector nozzle holder 10, the upper end of spring 22 contacts the upper end of cavity 26 while the lower end of spring 22 contacts spring seat 20. In this manner spring 22 exerts a biasing force against the upper end of needle 18 to bias the lower end of needle 18 against needle seat 16 to maintain the needle valve in the closed position. Fuel pressure at an appropriate level within passageway 14 exerts a force on needle 18 and displaces the entire needle assembly including needle 18 and spring seat 20 upward. Upward displacements of needle 18 are generally on the order of 0.4 to 0.7 millimeters.

In the preferred embodiment of the present invention, a cylindrical mounting bracket 28 includes a body which descends downward through the central spring cavity 24 of spring 22. In the embodiment illustrated the body of mounting bracket 28 is approximately 25 millimeters long and has a diameter of 4.3 millimeters. Mounting bracket 28 also includes a flange 30 on the upper surface. Flange 30 is positioned between the upper surface of cavity 26 and the upper end of spring 22. The upper biasing force exerted by spring 22 against the flange 30 which contacts the upper surface of cavity 26 serves to maintain mounting bracket 28 in a fixed position within the spring cavity 24 of spring 22.

A commerically available three lead header 32 is coupled to the lower portion of the body of mounting bracket 28. Header 32 is a commercially available TO-46 device which has been modified by removing the flange which surrounds the commercially available version. Two of the leads of header 32 pass through insulators in the header and penetrate the lower surface of the device. The third lead is a ground lead which is coupled directly to the metallic body of the header. Header 32 utilized in the preferred embodiment of the present invention is manufactured by Airpax Electronics Company of Cambridge, Maryland. The three electrical leads 34 extending upward from header 32 are fabricated from number thirty Teflon coated wire. Electrical leads 34 are routed upward through the body of mounting bracket 28 and pass through passageway 36 which forms a fuel leakage path by connecting the interior of cavity 26 through the hole(s) 50 in mounting bracket 28 to fuel discharge port 38. To permit electrical leads 34 to extend further upward and to be coupled to receptacle 40, a passageway extension 42 is machined into the body of nozzle holder 10.

A Hall Effect sensor 44 is coupled to the lower surface of header 32. Sensor 44 is manufactured on a single 0.066 inch by 0.068 inch integrated circuit chip by Sprague Electric Company of Concord, New Hampshire, and is designated by Model No. UGN-350. This commercially available Hall Effect sensor includes a voltage regulator, a Hall Effect cell and an amplifier. A layer of epoxy encapsulation 46 surrounds the lower exposed surface of sensor 44. The interior body of mounting bracket 28 is typically filled with a potting compound, such as epoxy material, to mechanically secure electrical leads 34.

A Samarium cobalt permanent magnet 48 is adhesively secured to the top surface of spring seat 20. Magnet 48 is approximately two millimeters thick and is fabricated in a size which permits it to be positioned on the upper cylindrical surface of spring holder 20 without extending beyond the perimeter of this device. Magnet 48 is small, but produces a magnetic flux density of about 1200 Gauss. The upper surface of magnet 48 is separated from the lower surface of epoxy encapsulation 46 by a spacing of about one millimeter when the needle valve is in the resting or unactuated position. When needle 18 is displaced upward by about 0.4 to 0.7 millimeters as the needle valve is opened, the magnetic flux density in the vicinity of Hall Effect sensor 44 is substantially changed, causing the output voltage of this device to change linearly in proportion to the displacement of needle 18. This change in output voltage is transmitted by leads 34 to receptacle 40. A monitoring device may be coupled to receptacle 40 and indicates both the upward and the downward displacements of needle 18 which corresponds to either an increase or a decrease of the magnetic flux density within cavity 26.

Referring now to FIG. 3, a modified version of the preferred embodiment of the present invention is disclosed. In this embodiment, permanent magnet 48 is coupled to the upper surface of header 32. Upward and downward displacements of spring holder 20 change the magnetic flux density in the vicinity of Hall Effect sensor 44 since spring holder 20 is fabricated from a ferromagnetic material. These changes in the flux density cause changes in the output state of sensor 44 in the same manner as that described above in connection with the embodiment illustrated in FIGS. 1 and 2.

FIG. 3 best illustrates that one or more vent holes 50 are positioned in the upper portion of mounting bracket 28. Vent holes 50 permit the free flow of discharge fuel from cavity 26 into fuel discharge passageway 36.

An oscilloscope may be coupled directly to receptacle 40 to monitor the output waveform generated by Hall Effect sensor 44. In this manner the timing of the needle valve opening and closing, the duration of injection, or continuous needle position can be monitored. In certain instances it may be desirable to couple a differentiator to receptacle 40 and couple an oscilloscope to the output of the differentiator. The differentiator produces a sharp readily discernable voltage spike when the needle valve either opens or closes.

The needle position indicator of the present invention may be included in each of the fuel injectors of an engine or may be included in only a single nozzle holder since engine timing can be set by reference to the opening time of only a single needle valve. Alternatively, the needle position indicator of the present invention may be included in a nozzle holder which is maintained at a maintenance station. Whenever it is necessary to set engine timing, a mechanic can remove the conventional nozzle holder from the engine and insert a nozzle holder including the needle position indicator of the present invention. The engine timing can thus be readily set and monitored by electronic monitoring devices used by the mechanic. Use of the needle position indicator permits engine timing to be set while the engine is running and in addition enables engine timing to be on a continuous basis.

The needle position indicator of the present invention may also be coupled to provide a feedback signal for use in a closed loop electronically controlled timing system for a fuel injection system. In another embodiment, the needle position indicator of the present invention can be used to monitor wear of fuel injection system components by measuring engine timing changes, particularly at low speed. When the engine timing has changed a predetermined amount as indicated by relative timing of the opening of the needle valve, maintenance personnel can replace the appropriate fuel injection system element to prevent untimely mechanical failure.

It would be apparent to those skilled in the art that the disclosed needle position indicator for a fuel injector nozzle holder may be modified in numerous ways and may assume many embodiments other than the preferred forms specifically set out and described above. For example, the present invention can be incorporated in many different configurations of nozzle holders manufactured by many different organizations for use in passenger cars, tractors, trucks, ships, or any other type of diesel engine. Accordingly, it is intended by the appended claims to cover all such modifications of the invention which fall within the true spirit and scope of the invention.

Referring now to FIGS. 4 and 5, another embodiment of the needle position sensing system of the present invention will now be described. This embodiment permits a needle position sensing device to be inserted into or removed from cylindrical cavity 26 without having to remove nozzle holder 10 from the engine and without having to disassemble nozzle holder 10.

In the nozzle holder embodiment illustrated in FIG. 4, a sensor passageway 52 is provided. The lower portion of sensor passageway 52 is aligned with the hollow interior of sensor holding means 54. The upper portion of sensor passageway 52 is inclined at an angle to the vertical, causing passageway 52 to intersect the exterior surface of nozzle holder 10 at a desired location. Generally, the diameter of both the upper and lower sections of passageway 52 and the diameter of the upper section of sensor holding means 54 will be slightly larger than the diameter of an externally insertable sensing means 56.

An aperture 58 is provided in the upper portion of sensor holding means 54 to permit unpressurized fuel which has leaked into cylindrical cavity 26 to be discharged into the interior of sensor holding means 54. The fuel passing through aperture 58 travels upward through sensor holding means 54 into the lower section of sensor passageway 52. It will be generally desirable to provide a separate fuel leakoff passageway which may be oriented in a place perpendicular to the plane defined by the upper and lower sections of sensor passageway 52. This separate fuel leak-off passageway is not specifically illustrated in FIG. 4, but would communicate between sensor passageway 52 and an exterior surface of nozzle holder 10. Leak-off fuel would then be coupled via a fuel discharge line back to the engine fuel tank.

The lower section of sensor holding means 54 includes a reduced diameter section indicated generally by reference number 60. The diameter of section 60 is approximately equal to the maximum dimension of needle position sensing means 56. The lower end of sensor holding means 54 includes means for preventing vertical translation of needle position sensor 54 below a predetermined point. In the embodiment illustrated in FIGS. 4 and 5, vertical translation preventing means takes the form of a second reduced diameter section indicated generally by reference number 62 and includes a diameter less than the maximum diameter of needle position sensor 56.

The upper portion of sensor passageway 52 is flared outward and is designed to receive a plug or cap 64. Plug 64 includes a cylindrical lower section which is inserted into sensor passageway 52 to prevent discharge of any leak-off fuel from this aperture in nozzle holder 10. Plug 64 may be manufactured from various different materials such as rubber, plastic or cork and may assume many different configurations other than the specific configuration illustrated in FIG. 4. It may also be desirable to provide some type of locking means or threads for securely attaching plug 64 to sensor passageway 52. Adaptations or modifications of this type would be well known by those skilled in the art.

As is illustrated in FIG. 4, the outer dimension of sensor holding means 54 is less than the inner diameter of spring 22. A flange 66 is formed at the upper end of sensor holding means 54 and serves to maintain the sensor holder in a fixed position within cavity 26.

In the embodiment illustrated, a magnet 48 of the same type specified for the FIG. 1 embodiment is coupled to the upper surface of spring seat 20 to generate a magnetic field within the interior of cylindrical chamber 26. As was discussed above, it is apparent that magnet 48 could be located at other positions within chamber 26 or alternatively could be coupled within sensing means 56 as is generally suggested by the configuration of the invention illustrated in FIG. 3. In other embodiments, spring seat 20, spring 22 or even other elements of the sensor holder might also be magnetized to provide the necessary magnetic flux density within the interior of cavity 26.

In the embodiment of the invention illustrated in FIG. 4 including magnet 48, a Hall effect sensor would be provided for sensing means 56. This Hall effect device can be fabricated in the manner specified in connection with the FIG. 1-3 embodiment discussed above. The Sprague Electric Company Hall effect sensor described above is also usable in this embodiment of the invention.

In order to maximize the magnitude of the electronic signal produced by the Hall effect chip as needle 18, spring seat 20 and magnet 48 are displaced up and down, it is desirable to minimize the spacing between the upper surface of magnet 48 and the Hall effect chip which is positioned in the lowermost portion of sensing means 56. To accomplish this objective, sensor holding means 54 should be dimensioned so that a gap on the order of 0.2-0.3 millimeters exists between the upper surface of magnet 48 and the lower horizontal surface of second reduced diameter section 62 when needle 18 is displaced approximately 0.4-0.7 millimeters upward into a position which corresponds to the "open" or fuel metering position. The spacing between the Hall effect chip and the upper surface of magnet 48 can also be reduced by minimizing the thickness or vertical dimension of second reduced diameter section 62 to a distance between 0.1-2.0 millimeters. The strength of the material from which sensor holding means 54 is fabricated will have a direct bearing on the extent to which the thickness of second reduced diameter section 62 can be minimized. To assist in maximizing the sensitivity of sensor means 56 a flat Hall effect chip should generally be oriented in a plane parallel to the upper surface of magnet 48.

It must be remembered that the dimensions and geometric orientations recited immediately above relate only to the specific preferred embodiment of the invention being described at the present time. It will be readily apparent to one of ordinary skill in the art that numerous different structural configurations of sensor holding means 54 and different orientations and shapes of the Hall effect chip could be made to work in a highly satisfactory manner without deviating from the scope of the present invention.

Many other different types of needle position sensing means could be substituted for the Hall effect sensor. For example, an eddy current proximity measuring device of a type generally similar to the proximity measuring system sold by Kaman Measurement Systems of Colorado Springs, Colo. could be utilized. An eddy current position sensing device uses an inductive operating principle to measure the distance between a coil (the sensing device) and a metallic object such as the moving needle spring seat system. The proximity of the sensor to the target material controls the operating amplitude of an oscillator. These amplitude variations are detected and electronically conditioned to provide an analog signal proportional to the displacement of the moving metallic object. The Kaman model KD-2400 proximity measuring system provides sensors of various dimensions. In the eddy current sensor version of the present invention, the sensor must be designed such that it could be displaced through passageway 52 and inserted into sensor holder 56 as described above.

Inductive, capacitative or various other different kinds of sensing means could readily be adapted to be used with the nozzle holder system illustrated in FIGS. 4 and 5.

A multi-conductor electrical cable 68 is coupled to sensing means 56 and serves a two-fold purpose. First, cable 68 provides electrical communication between an indicator unit (such as an oscilloscope) and sensing means 56. Second, cable 68 serves as a tether for sensing means 56 and permits the removal and insertion of sensing means 56 into the desired fixed position in the lower portion of sensor holding means 54. Cable 68 must be sufficiently flexible to flex around the corner formed between the upper and lower elements of sensor passageway 52. On the other hand, cable 68 must be sufficiently stiff to permit the user to externally apply a force which will cause sensing means 56 to be displaced into the appropriate position in the lower portion of sensor holding means 54. As a result of the mechanical vibrations imparted by the engine to nozzle holder 10, it may be desirable for the operator to maintain a downward pressure or biasing force on cable 68 to maintain sensing means 56 firmly in position in the lower portion of sensor holding means 54.

One of the primary advantages of the needle position sensing system described immediately above is a dramatic cost saving in comparison to the non-removable needle position sensor illustrated in FIGS. 1-3. With the removable needle position sensing system, the comparatively expensive sensor must only be inserted at the specific time when it is desired to adjust engine timing or to otherwise measure or control engine performance. Therefore, a single comparatively expensive sensor can at any time be inserted into or removed from a nozzle holder of the type illustrated in FIG. 4.

If, on the other hand, sensor 56 forms a part of a closed loop fuel injection system and therefore must be continuously present within nozzle holder 10, the removable feature of the present invention permits a defective sensor to readily be removed and replaced. It is thus not necessary to remove and replace the entire nozzle holder assembly and thereby break the seal in the high pressure fuel injection system, nor is it necessary to discard an entire nozzle holder merely because the sensor has failed. In a closed loop fuel injection system of this type, cable 68 would be routed directly through the center of plug 64 so that plug 64 can be maintained in position in nozzle holder 10 while cable 68 and sensor 56 are in position within nozzle holder 10.

It will be apparent to those skilled in the art that the disclosed removable needle position sensor system described above may be modified in numerous ways and may assume many embodiments other than the preferred forms specifically set out and described above. For example, needle position sensors not yet invented at the present time may be readily adaptable for use in the present invention or other presently available but excessively large position sensing devices may be miniaturized in the future to a point where they can be inserted into the specially adapted nozzle holder described above. Accordingly, it is intended by the appended claims to cover all such modifications of the invention which fall within the true spirit and scope of the invention.

I claim:

1. A fuel injector nozzle holder capable of receiving a needle position sensor comprising:
   (a) a needle coupled within said nozzle holder and displaceable between open and closed positions;
   (b) a chamber within said nozzle holder;
   (c) a spring in said chamber for biasing said needle into the closed position;
   (d) a passageway in said nozzle holder and through said spring for establishing communication with said chamber from a location external to said nozzle holder;
   (e) a sensor holder within said chamber and aligned with said passageway for guiding said sensor into a pre-determined position with respect to said needle and for maintaining said sensor in a fixed position after said sensor is fully inserted into said holder; and
   (f) the needle position sensor dimensioned for sliding insertion and removal through said passageway, said sensor including a sensing element at the extremity thereof engageable in said sensor holder.

2. The nozzle holder of claim 1 further including means for generating a magnetic field within said chamber.

3. The nozzle holder of claim 2 wherein said magnetic field generating means is coupled to said needle.

4. The nozzle holder of claim 3 wherein said magnetic field generating means includes a magnet.

5. The nozzle holder of claim 1 wherein said chamber is generally cylindrical in configuration.

6. The nozzle holder of claim 5 wherein said spring includes a helically wound spring which forms a generally cylindrical spring cavity.

7. The nozzle holder of claim 6 wherein said sensor holder is positioned within the spring cavity of said spring and includes upper and lower ends.

8. The nozzle holder of claim 7 wherein the upper end of said sensor holder includes a flange.

9. The nozzle holder of claim 8 wherein the flange of said sensor holder is positioned between the upper end of said spring and said cavity.

10. The nozzle holder of claim 9 wherein said passageway is aligned with the upper end of said sensor holder.

11. The nozzle holder of claim 7 wherein the lower end of said sensor holder includes a reduced diameter section wherein the diameter of said reduced diameter section is approximately equal to the maximum dimension of said needle position sensor.

12. The nozzle holder of claim 7 wherein the lower end of said sensor holder includes means for preventing vertical translation of said needle position sensor below a predetermined point.

13. The nozzle holder of claim 12 wherein said translation preventing means comprises a reduced diameter section having a diameter less than the maximum diameter of said needle position sensor.

14. The nozzle holder of claim 7 wherein said sensor holder includes an aperture in the side thereof for establishing a fuel leakage flow path from said chamber through said sensor holder into said passageway.

15. The nozzle holder of claim 1 further including means for closing off said passageway to prevent leakage of fuel from said nozzle holder.

16. The nozzle holder of claim 15 wherein said closing off means includes a plug inserted into said passageway where said passageway intersects the exterior of said nozzle holder.

17. The nozzle holder of claim 16 wherein said needle position sensor includes electrical leads and wherein said electrical leads pass through and form a part of said plug.

18. The nozzle holder of claim 1 wherein said sensor includes a Hall effect sensor.

19. The nozzle holder of claim 1 wherein said sensor includes an eddy current sensor.

20. The nozzle holder of claim 1 wherein said sensor includes a capacitative sensor.

21. The nozzle holder of claim 1 wherein said sensor includes and inductive sensor.

22. A needle position sensing system for a fuel injector nozzle holder including:
(a) a needle within said nozzle holder and displaceable between open and closed positions;
(b) a chamber within said nozzle holder;
(c) a spring within said chamber for biasing said needle into the closed position;
said sensing system comprising:
(a) a passageway through said nozzle holder and said spring for establishing communication with said chamber from a location external to said nozzle holder;
(b) means for sensing displacements of said needle when positioned in proximity thereto, said sensing means dimensioned for insertion and removal through said passageway; and
(c) sensor holder means aligned with said passageway for guiding said sensing means into a predetermined position adjacent to said needle for maintaining said sensing means in a fixed position after said sensing means is fully inserted into said sensor holder means.

23. The sensing system of claim 22 wherein said spring comprises a helically wound spring which forms a generally cylindrical spring cavity.

24. The sensing system of claim 23 wherein said sensor holder means is positioned within the spring cavity of said spring and includes upper and lower ends.

25. The sensing system of claim 24 wherein the upper end of said sensor holder means includes a flange.

26. The sensing system of claim 25 wherein the flange of said sensor holder means is positioned between the upper end of said spring and said cavity.

27. The sensing system of claim 26 wherein said passageway is aligned with the upper end of said sensor holder means.

28. The sensing system of claim 27 further including means for generating a magnetic field within said chamber.

29. The sensing system of claim 28 wherein said magnetic field generating means is coupled to said needle.

30. The sensing system of claim 23 wherein said magnetic field generating means includes a magnet.

31. The nozzle holder of claim 22 wherein said sensor includes a Hall effect sensor.

32. The nozzle holder of claim 22 wherein said sensor includes an eddy current sensor.

33. The nozzle holder of claim 22 wherein said sensor includes a capacitive sensor.

34. The nozzle holder of claim 22 wherein said sensor includes an inductive sensor.

35. A fuel injector nozzle holder capable of receiving a needle position sensor and including:
(a) a needle coupled within said nozzle holder and displaceable between open and closed positions;
(b) a chamber positioned within said nozzle holder;
(c) means positioned within said chamber and coupled to said needle for biasing said needle into the closed position;
wherein the improvement comprises:
(a) a passageway in said nozzle holder for establishing communication with said chamber from a location external to said nozzle holder; and
(b) a sensor holder positioned within said cavity and aligned with said passageway for guiding said sensor into a predetermined position with respect to said needle and for maintaining said sensor in a fixed position after said sensor is fully inserted into said holder, said sensor holder including
i. a tubular body having upper and lower ends;
ii. a first reduced diameter section within the lower portion of said tubular body wherein the diameter of said reduced diameter section is approximately equal to the maximum dimension of said needle position sensor; and
iii. a second reduced diameter section coupled to the lower end of said sensor holder and having a diameter less than the maximum diameter of said needle position sensor.

36. The nozzle holder of claim 35 wherein said sensor holder includes an aperture in the side thereof for establishing a fuel leakage flow path from said chamber through said sensor holder into said passageway.

37. The nozzle holder of claim 35 further including means for closing off said passageway to prevent leakage of fuel from said nozzle holder.

38. The nozzle holder of claim 37 wherein said closing off means includes a plug inserted into said passageway where said passageway intersects the exterior of said nozzle holder.

39. The nozzle holder of claim 35 further including means for generating a magnetic field within said chamber.

40. The nozzle holder of claim 39 wherein said magnetic field generating means includes a magnet.

41. The nozzle holder of claim 35 wherein said sensor includes a Hall effect sensor.

42. The nozzle holder of claim 35 wherein said sensor includes an eddy current sensor.

43. The nozzle holder of claim 35 wherein said sensor includes a capacitive sensor.

44. The nozzle holder of claim 35 wherein said sensor includes an inductive sensor.

45. The nozzle holder of claim 35 wherein the thickness of said second reduced diameter section lines between 0.1–2.0 millimeters.

46. A needle position sensing system for a fuel injector nozzle holder including:
(a) a needle within said nozzle holder and displaceable between open and closed positions;
(b) a chamber within said nozzle holder;
(c) means positioned within said chamber and coupled to said needle for biasing said needle into the closed position;
said sensing system comprising:

(a) a passageway on said nozzle holder for establishing communication with said chamber from a location external to said nozzle holder;
(b) a needle position sensor means dimensioned for slideable insertion and removal through said passageway; and
(c) sensor holder means aligned with said passageway for guiding said sensor means into a predetermined position adjacent to said needle and for maintaining said sensor means in a fixed position with respect to said sensor holder means.

47. A fuel injection needle position sensing system comprising:
(a) a nozzle holder having a longitudinally moveable needle therein displaceable between open and closed positions, said nozzle holder having an internal chamber with the upper extremity of said needle extending into said chamber;
(b) a helical spring in said chamber for biasing said upper extremity of said needle longitudinally toward said closed position, said spring defining a central passageway;
(c) a magnet disposed on the upper extremity of said needle; and
(d) sensor means including a Hall Effect sensor element at the extremity of a conductive cable, said sensor element and cable dimensioned for sliding insertion into and removal from said passageway and adjacent said magnet, whereby said Hall Effect sensor may detect changes in the magnetic field of said magnet caused by movement of said needle.

* * * * *